(12) United States Patent
Comstock

(10) Patent No.: US 6,702,358 B2
(45) Date of Patent: Mar. 9, 2004

(54) TRUCK BED COVER LOCK

(76) Inventor: Mark A. Comstock, 12329 Telegraph Rd., Santa Fe Springs, CA (US) 90670

( * ) Notice: Subject to any disclaimer, the term of this patent is extended or adjusted under 35 U.S.C. 154(b) by 0 days.

(21) Appl. No.: 10/329,799

(22) Filed: Dec. 27, 2002

(65) Prior Publication Data

US 2003/0141740 A1 Jul. 31, 2003

Related U.S. Application Data

(60) Provisional application No. 60/352,574, filed on Jan. 31, 2002.

(51) Int. Cl.$^7$ ................................................ B60P 7/02
(52) U.S. Cl. ............ 296/100.02; 292/144; 292/DIG. 43
(58) Field of Search ..................... 296/100.01, 100.02, 296/100.04, 100.07; 292/144, 341.16, DIG. 43

(56) References Cited

U.S. PATENT DOCUMENTS

| | | | |
|---|---|---|---|
| 4,579,376 A | * | 4/1986 | Charlton ..................... 292/144 |
| 5,123,691 A | | 6/1992 | Ginn |
| 5,727,835 A | | 3/1998 | Krush et al. |
| 5,909,921 A | | 6/1999 | Nesbeth |
| 5,964,487 A | * | 10/1999 | Shamblin ..................... 292/144 |
| 6,290,441 B1 | * | 9/2001 | Rusu ..................... 296/100.07 |
| 6,343,828 B1 | * | 2/2002 | Young et al. ............ 296/100.1 |
| 6,427,500 B1 | * | 8/2002 | Weinerman et al. ... 296/100.07 |
| 2002/0063438 A1 | * | 5/2002 | Rusu ..................... 296/100.07 |
| 2002/0105200 A1 | * | 8/2002 | Reynolds et al. .............. 296/3 |

* cited by examiner

Primary Examiner—D. Glenn Dayoan
Assistant Examiner—Patricia L. Engle
(74) Attorney, Agent, or Firm—Richard C. Litman

(57) ABSTRACT

A truck bed cover lock having two locking units positioned to interact with the existing latch locks present on most bed covers. Each locking unit contains an actuator which is electronically connected to the existing or added on electric locks in a truck. When the door locks in the truck are electrically locked the actuators extend a sliding latch into position behind the latch locks present on the bed cover thereby preventing the bed cover from being opened. Conversely, when the truck locks are electrically unlocked the actuators retract the sliding locks and permit the bed cover to be opened. The invention may be an OEM (factory) item, or an aftermarket item.

11 Claims, 5 Drawing Sheets

TRUCK BED COVER LOCK

This application claims the benefit of U.S. Provisional Patent Application Serial No. 60/352,574, filed Jan. 31, 2002.

BACKGROUND OF THE INVENTION

1. Field of the Invention

The present invention relates to automatic truck locks, in particular to an automatic electric locking device for truck bed covers.

2. Description of Related Art

Many pickup truck users, in an effort to secure and protect valuables stored in their truck beds from the elements or theft, have installed rigid covers which enclose a truck's bed. These covers are typically referred to as cargo covers or tonneau covers. These covers ordinarily must be manually locked and unlocked in order for them to perform as desired. Manual locking often involves using a key to engage two different locking mechanisms located on the bed cover near the back quarter panels of most trucks. The locking mechanisms most often consist of a rotating barrel and an attached latch. The user must use a key to rotate the barrel until the attached latch swings into a locked or unlocked position. This process is time consuming and bothersome, especially in inclement weather or when making a multitude of short trips to load or unload cargo.

There is, therefore, a need for an automatic mechanism for locking and unlocking truck covers which saves time and effort and can be controlled from a truck's cab. The present invention fills this need by incorporating an automatic locking and unlocking mechanism into a truck's existing electric door locking system.

U.S. Pat. No. 5,123,691 discloses an automatic lock for a truck toolbox. The present invention differs from the '691 device in that the present invention is designed for a trunk bed cover, not a tool box; the method of lock actuation is different; and control of the present invention, unlike the '691 device, is integrated into the existing electronic locking system in the truck.

U.S. Pat. No. 5,727,835 discloses an automatic alarm and locking system for a truck toolbox. This system, unlike the present invention, is not connected to the existing electric locks of a truck, and is not designed to operate the dual locking mechanism present in a truck bed cover.

U.S. Pat. No. 5,909,921 discloses a lifting device for a truck bed cover. This device is not designed for locking a truck bed cover into place, nor is it connected to the electric locking system present in the truck.

None of the above inventions and patents, taken either singly or in combination, is seen to describe the instant invention as claimed.

SUMMARY OF THE INVENTION

The truck bed cover lock system has two automatic locking units. Each locking unit has a two-wire universal lock actuator with a telescoping arm. The actuator is mounted to a flat rectangular back plate. The back plate is mounted to a truck rail support which is typically located on the inside portion of a truck's bed rail adjacent to the tailgate. The actuator arm is connected to a sliding latch and functions to move the latch between locked and unlocked positions. When in the locked position the latch is in close connection with the existing key lock latch on the truck bed cover. A two-wire cord connects each actuator to a truck's electric door lock circuit.

When current is applied to a truck's electric door locking circuit, current also flows to the actuators in such a way that when a truck's doors are electrically locked, the actuators move the sliding latches into the locked position. Likewise, when a truck's doors are electrically unlocked the actuators function to move the sliding latches into the unlocked position.

Accordingly, it is a principal object of the invention to provide the operator of a truck having a bed cover with the convenience of electric bed cover locks.

It is another object of the invention to allow the operator of a truck equipped with a bed cover the convenience of unlocking and locking the doors of his truck and the bed cover at the same time.

It is a further object of the invention to provide a system which will secure a truck bed cover when the driver of the truck locks the truck doors either manually or with a remote control.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
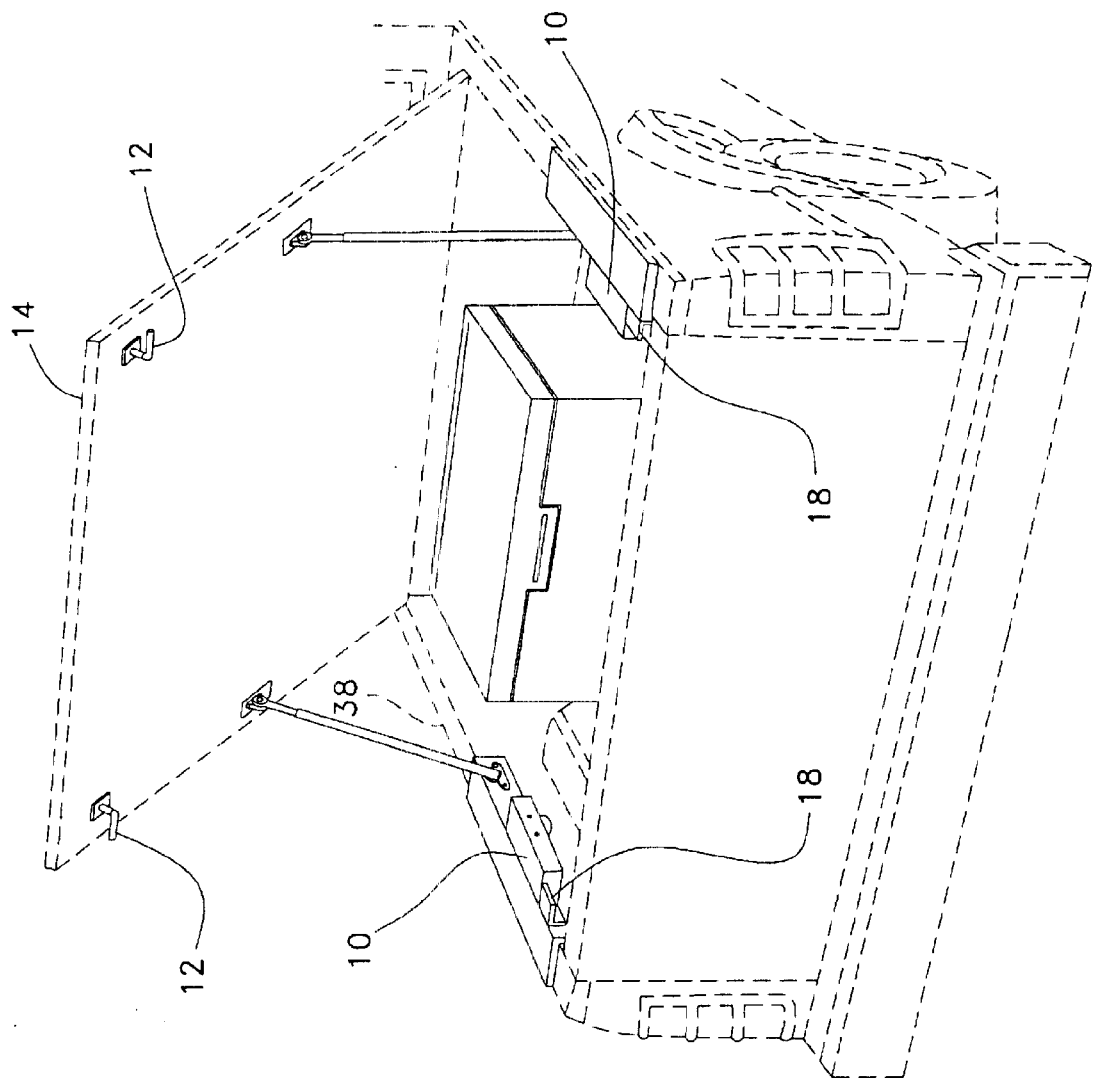
FIG. 1 is an environmental, perspective view of a truck bed cover lock according to the present invention.

The present invention is a truck bed cover lock which can function with one, but has preferably two, locking units. Each locking unit 10, as seen in FIG. 1, is located on the rear inside portion of a truck bed rail. The locking units are designed to interact with the rotating latch locks 12 present on nearly all truck bed covers 14. The cover 14 is shown in the open position in FIG. 1. When the bed cover 14 is in its closed position (resting against the truck bed rails), a sliding latch 18 (discussed below) in each locking unit 10 can be moved into a locked position behind each rotating latch lock 12, thereby preventing the bed cover 14 from returning to its open position. FIG. 1 shows the sliding latches 18 extended and the bed cover 14 open for illustration purposes only. Ordinarily the sliding latches 18 would be retracted when the cover 14 is open.

Figure 2:
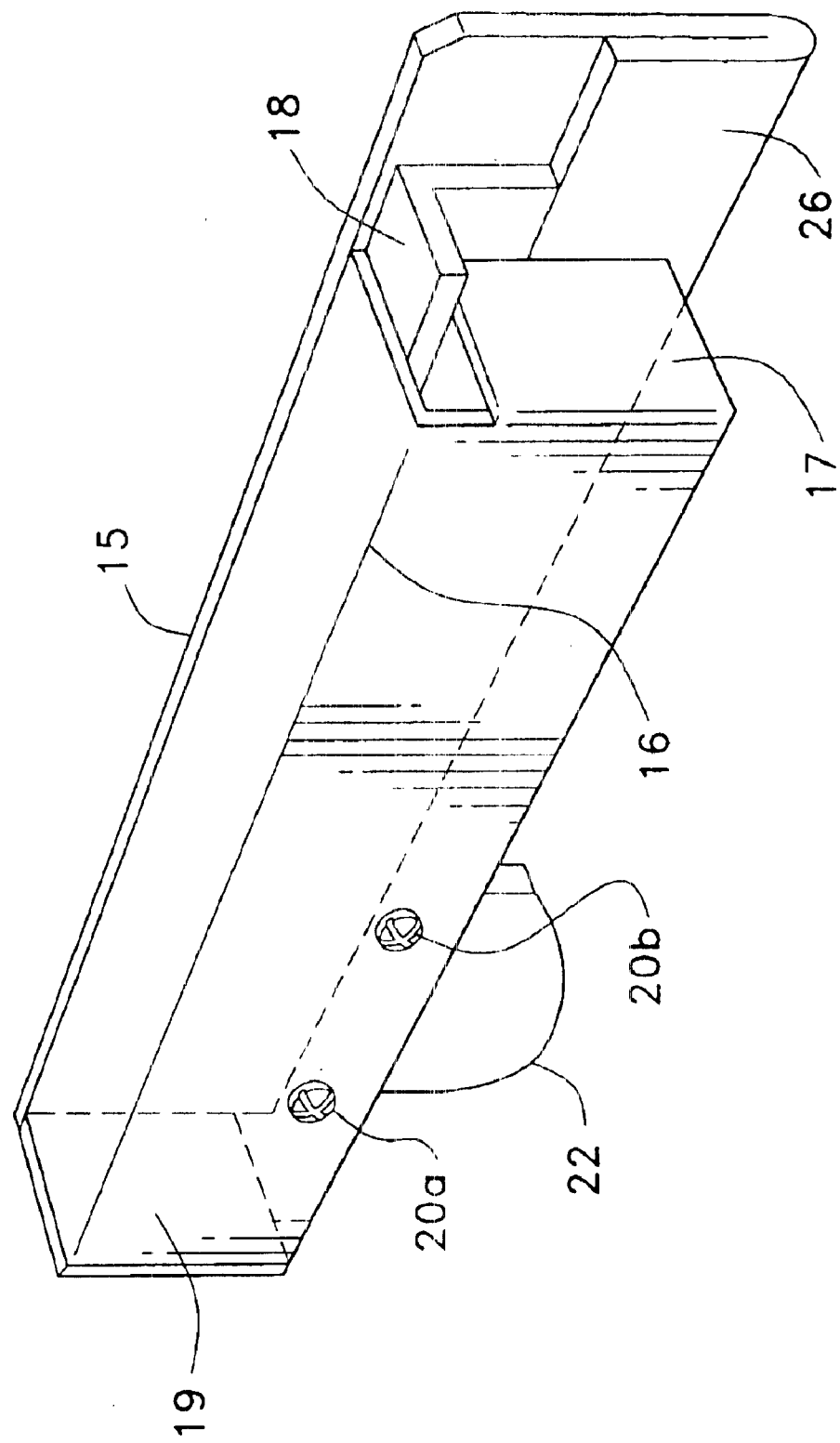
FIG. 2 is a perspective view of a truck bed cover lock.

As seen in FIG. 2, each locking unit 10 has a housing 15 with a front surface, top surface, back surface and two end surfaces. The housing 15 may be made from a steel angle 16, two end plates 17 and 19, and a back plate 26. The angle 16 forms the top surface and the front surface of the housing 15. Welded to or formed with one end of the front surface of angle 16 is a flat rectangular steel end plate 17 which forms one of the end surfaces. There is a gap defined between end plate 17 and the top flange of angle 16 to allow the sliding latch 18 to emerge from the interior of the housing 15. A second rectangular end plate 19 of steel is welded to or formed with angle 16 to form the second end surface of the housing 15. Two bolts 20a, 20b extend through holes defined in the front surface of angle 16 and secure angle 16 to the rectangular back plate 26. The bolts 20a, 20b also secure a universal lock actuator 22 (discussed below) inside the housing 15. Back plate 26 has a ledge defined thereon extending longitudinally which forms a guide which supports the downwardly extending flange of sliding latch 18 and ensures that the latch slides smoothly, remains level, and is properly positioned between the end plate 17 and angle 16.

Figure 3:
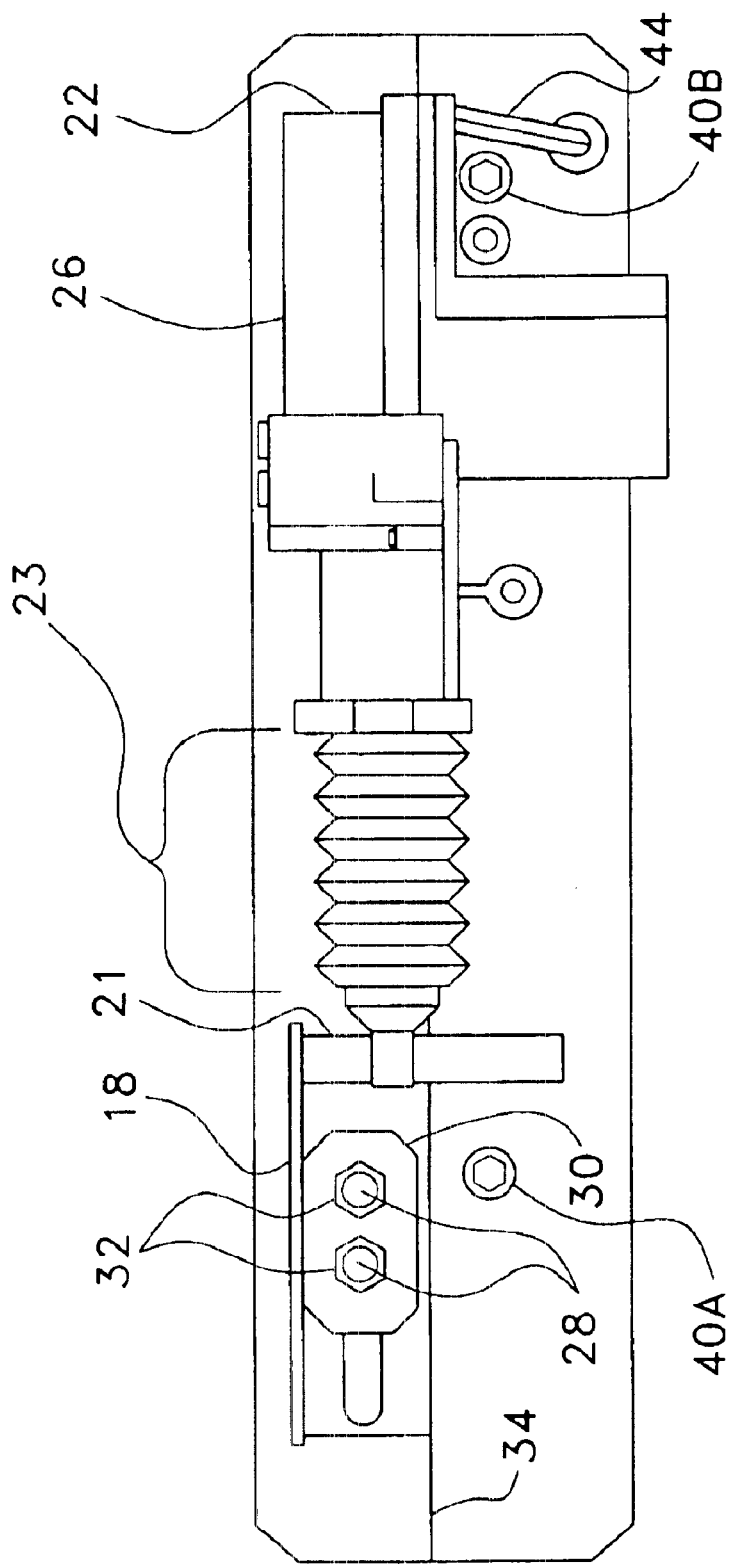
FIG. 3 is a front view of the internal components of a truck bed lock in the locked position.

FIG. 3 shows the internal components of a locking unit 10. A two wire universal lock actuator 22 is secured to the back plate 26. Universal lock actuators (ACT2) are well known in the art and may be purchased from a number of sources, including GNU Industries, Inc., Slickcar.com, or Autotech.com. The actuator 22 has a telescoping arm 23 which functions to move the sliding latch 18.

The sliding latch 18 preferably is an angle made of steel with a connection cylinder 21 attached to one end and a slot defined in the flange which is parallel to back plate 26 adjacent the other end of latch 18. The telescoping arm 23 of the actuator 22 connects to the connection cylinder 21 of the sliding latch 18. Two studs 28 are welded to the back plate 26 and have threaded ends which extend through the slot in the sliding latch 18. A washer 30 is positioned over the threaded ends of the studs 28. Two nuts 32 are screwed onto the threaded ends of the studs 28 and secure both the washer 30 and the sliding latch 18 to the back plate 26, but there is a sufficient gap between the washer 30 and back plate 26 for latch 18 to slide therebetween.

The back plate 26 is folded onto itself in such a way that the folded edge of the back plate 26 forms a guide rail 34 for the sliding latch 18. Alternatively, a flat plate may be welded to back plate 26 to define the ledge or guide rail 34. The guide rail 34 functions to guide and support the sliding latch 18. The back plate 26 is secured to the truck bed rail support 38 with two Allen screws 40a, 40b.

Figure 4:
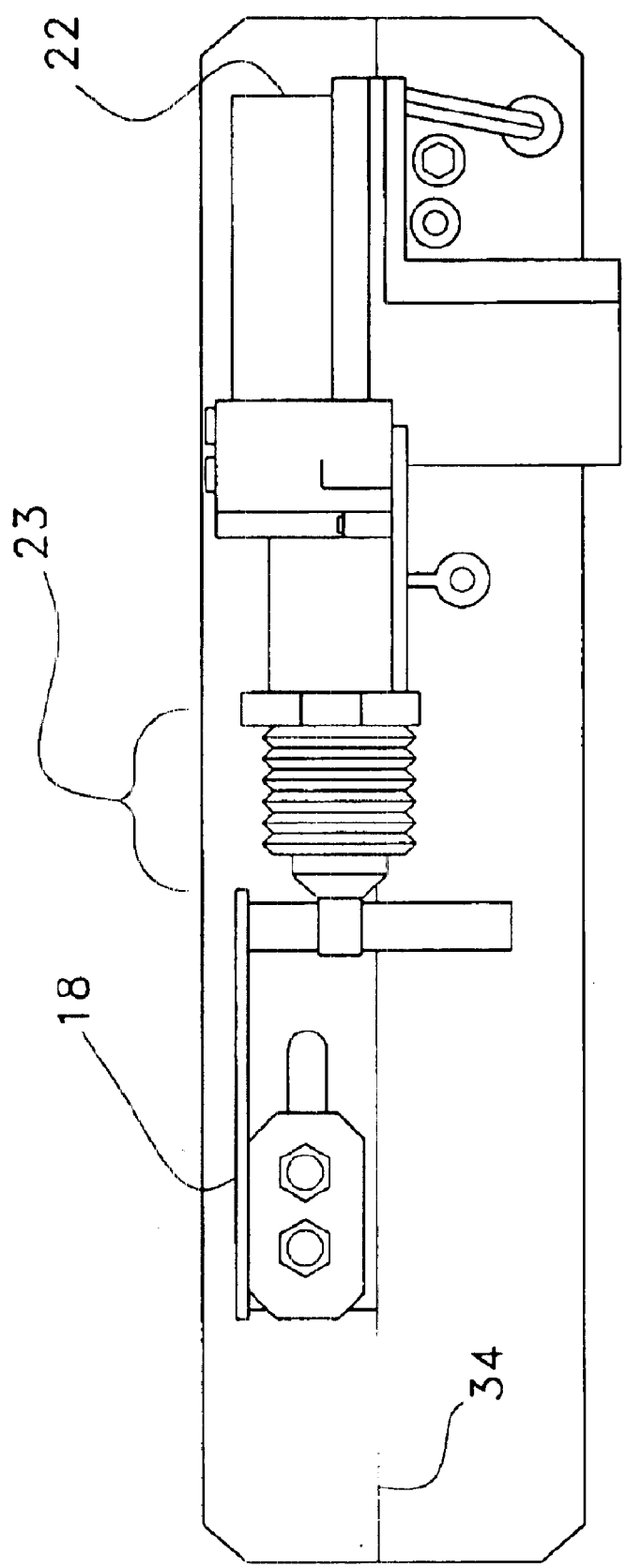
FIG. 4 is a front view of the internal components of a truck bed lock in the unlocked position.

In operation, the actuator alternates between locked and unlocked positions. FIG. 3 shows the internal components of the truck bed cover lock in the locked position. The telescoping arm 23 is fully expanded and the sliding latch 18 is positioned near the left edge of the support rail 34. FIG. 4 shows the internal components of the truck bed cover lock in the unlocked position. The telescoping arm 23 is in the retracted position and the sliding latch 18 is positioned drawn back from the end of the support rail 34.

Conventional truck bed covers are equipped with a pair of cylinder locks at opposite corners of the truck cover. Each cylinder lock has a barrel-type cylinder with a tongue latch at the bottom of the barrel which rotates to engage and disengage a keeper when a key is inserted into the cylinder and rotated. When the lock units 10 of the present invention are installed, the existing lock keepers are removed and replaced with the lock units 10. The existing cylinder lock is maintained in the locked position, the key lock being unused with the present invention, so that the tongue latch is always pointing towards the truck rail or sidewall. When the lock unit 10 is in the locked position, the top flange of the angle-shaped sliding latch 18 is moved to a position above the tongue latch of the truck cover's conventional cylinder lock, so that the cover cannot be raised. When the lock unit is in the unlocked position, the top flange of the sliding latch 18 is retracted, so that it is no longer interposed between the truck cover and the tongue latch, and the cover is free to be raised. In this manner the tongue latch of the cylinder locks act as fixed position keepers which coact with the sliding latches 18 of the lock unit 10. Alternatively, an L-shaped or U-shaped bracket may be attached to the bottom surface of the truck cover with one of the flanges directed towards the truck rail on which the lock unit 10 is mounted in order to provide a fixed mount keeper which coacts with the sliding latch 18 in similar fashion.

Figure 5:
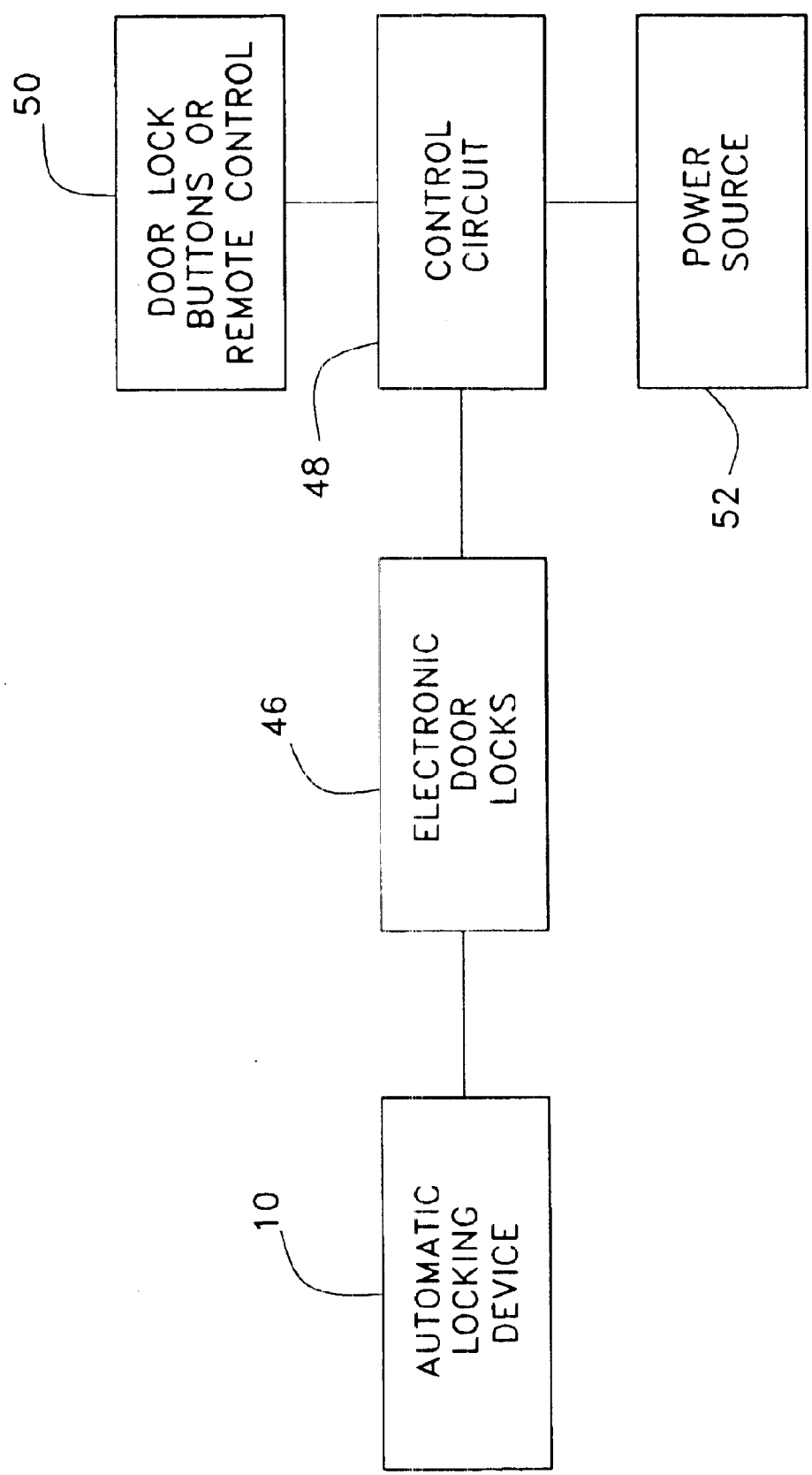
FIG. 5 is a block diagram of the electronic connections involved with the present invention.

A two wire electric cord 44 extends from the back of each actuator 22 and passes through a hole defined in the back plate 26. FIG. 5 diagrams the connections made between the automatic bed cover locking units 10 and a vehicle's electric door locks 46 and control circuits 48. The electric cord 44 connects the automatic locking units 10 in parallel with the electric door locks 46. The cord 44 preferably travels under the bed rail to the back wall of the cab, from the cab down through the bed to the truck frame, from the frame to a position under the cabin, and from the under the cabin to the electric door lock circuit 46. The exact pathway traveled by the wire is not critical to the present invention and any pathway could be used so long as the actuator cord 44 is connected to the electric door lock circuit 46. The door locks 46 are connected to a control circuit 48 which is connected to the door lock buttons 50 located inside the truck. The control circuit 48 may also be capable of receiving signals from a remote control device, such as a key fob. The control circuit 48 is connected to a power source 52 such as a vehicle alternator or battery.

When the electric door locks 46 in a truck are activated to lock or unlock a door lock 46, the actuators 22 in each locking unit 10 are simultaneously activated such that when the truck door locks 46 are electrically locked, the actuator arms 23 extend the sliding latches 18 into their locked positions. Conversely when the electric door locks 46 are electrically unlocked, the arms 23 of the actuators 22 in each locking unit 10 move their sliding latches 18 into the unlocked position. The present invention may also be manually operated by grasping and moving an extension of connection cylinder 21 which extends through the open bottom of housing 15 below angle 16 and serves as a manual release lever, and which can extend or retract arm 23 and will thereby move the attached latch 18.

It is to be understood that the present invention is not limited to the sole embodiment described above, but encompasses any and all embodiments within the scope of the following claims.

I claim:

1. A truck bed cover lock for automatically locking and unlocking a truck bed cover on an open bed truck, comprising:
    at least one locking unit adapted to be secured to a truck bed rail in an open bed truck, said locking unit having:
        a latch adapted for engaging a keeper on a truck bed cover; and
        an actuator attached to the latch for moving the latch between a locked position and an unlocked position;
    at least one two wire electric cord electrically connected to said actuator and adapted for connecting said actuator to a vehicular electronic door lock circuit, whereby said locking unit may be switched between the locked position and the unlocked position by operation of a vehicle's door locks.

2. The truck bed cover lock according to claim 1, further comprising:

a housing enclosing said actuator and partially enclosing said latch, said housing comprising a top surface, a front surface, a back surface, and two opposing end surfaces.

3. The truck bed cover lock according to claim 2, wherein said latch has a slot defined therein, the truck bed cover lock further comprising:
   a ledge defined on the back surface of said housing, the ledge guiding said latch;
   at least one bolt disposed upon the back surface of said housing, said bolt protruding through the slot defined in said latch;
   at least one nut secured to said bolt;
   at least one washer disposed on said bolt between said nut and said latch, said latch being slidable on said at least one bolt within limits defined by said slot and being guided by said ledge.

4. The truck bed cover lock according to claim 1, wherein said latch comprises an angle having a first flange aligned parallel with and slidable on a sidewall of a truck bed, and having a second flange normal to said first flange and extending into the truck bed, said second flange being adapted for coacting with a keeper depending from the truck bed cover to lock and unlock the truck bed cover.

5. The truck bed cover according to claim 1, further comprising:
   a connection cylinder disposed between said actuator and said latch;
   wherein said connection cylinder may be grasped and used to manipulate said latch.

6. A truck bed cover lock in combination a truck bed cover for an open bed truck, comprising:
   a truck bed cover having a first end adapted for being pivotally mounted over an open bed in a truck, the cover having a bottom surface and a second end with opposing corners, the cover further having a keeper mounted at the opposing corners;
   a pair of locking units, each locking unit having:
      at least one latch adapted for engaging the keeper on a truck bed cover corner;
      at least one actuator attached to the latch for moving the latch between a locked position and an unlocked position; and
      at least one electric cord electrically connected to said actuator and adapted for connecting said actuator to a truck electronic door lock circuit, whereby said locking unit may be switched between the locked position and the unlocked position by operation of a truck's door locks.

7. The truck bed cover lock in combination a truck bed cover for an open bed truck according to claim 6, further comprising:
   a housing enclosing each said actuator and partially enclosing each said latch, each said housing comprising a top surface, a front surface, a back surface, and two opposing end surfaces.

8. The truck bed cover lock in combination a truck bed cover for an open bed truck according to claim 7, further comprising:
   at least one ledge defined on the back surface of each said housing, the ledge guiding said latch;
   at least one bolt disposed upon the back surface of said housing, said bolt protruding through a slot defined in said latch;
   at least one nut secured to said bolt;
   at least one washer disposed on said bolt between said nut and said latch, said latch being slidable on said at least one bolt within limits defined by said slot and being guided by said ledge.

9. A truck bed cover lock in combination with an open bed truck having a truck bed cover pivotally disposed over the truck bed, comprising:
   a truck having an open bed and having an electronic door lock with door lock control circuitry;
   a truck bed cover disposed over the truck bed having a first end pivotally mounted to the truck, the cover having a bottom surface and a second end with opposing corners, the cover further having a keeper mounted at the opposing corners;
   a pair of locking units, each locking unit having:
      a latch adapted for engaging the keeper on a truck bed cover corner;
      an actuator attached to the latch for moving the latch between a locked position and an unlocked position; and
      an electric cord electrically connected to said actuator and to the door lock control circuit, whereby said locking unit may be switched between the locked position and the unlocked position by operation of the truck's door lock.

10. The truck bed cover lock in combination with an open bed truck having a truck bed cover pivotally disposed over the truck bed as in claim 9, further comprising:
    a housing enclosing each said actuator and partially enclosing each said latch, each said housing comprising a top surface, a front surface, a back surface, and two opposing end surfaces.

11. The truck bed cover lock in combination with an open bed truck having a truck bed cover pivotally disposed over the truck bed as in claim 10, further comprising:
    at least one ledge defined in the back surface of each said housing, the ledge guiding said latch;
    at least one bolt disposed upon the back surface of said housing, said bolt protruding through a slot defined in said latch;
    at least one nut secured to said bolt;
    at least one washer disposed on said bolt between said nut and said latch, said latch being slidable on said at least one bolt within limits defined by said slot and being guided by said ledge.

* * * * *